United States Patent
Neumeister et al.

(10) Patent No.: US 8,875,532 B2
(45) Date of Patent: Nov. 4, 2014

(54) DEVICE FOR REGULATING THE TEMPERATURE OF A PLURALITY OF COMPONENTS OF A VEHICLE AND VEHICLE SYSTEM

(75) Inventors: Dirk Neumeister, Stuttgart (DE); Matthias Stripf, Karlsruhe (DE); Manuel Wehowski, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 260 days.

(21) Appl. No.: 13/613,659

(22) Filed: Sep. 13, 2012

(65) Prior Publication Data
US 2013/0061627 A1 Mar. 14, 2013

(30) Foreign Application Priority Data
Sep. 13, 2011 (DE) .......................... 10 2011 082 584

(51) Int. Cl.
*B60H 1/32* (2006.01)
*B60L 3/00* (2006.01)
*B60L 1/00* (2006.01)
*B60L 11/18* (2006.01)

(52) U.S. Cl.
CPC ................ *B60L 1/003* (2013.01); *Y02T 10/705* (2013.01); *B60L 3/0061* (2013.01); *B60L 2240/34* (2013.01); *B60L 3/0046* (2013.01); *Y02T 10/642* (2013.01); *B60L 3/003* (2013.01); *Y02T 10/7005* (2013.01); *B60L 2240/425* (2013.01); *B60L 11/187* (2013.01); *B60L 2240/36* (2013.01); *B60L 2240/525* (2013.01); *B60L 11/1874* (2013.01)
USPC ............................................................ 62/243

(58) Field of Classification Search
USPC ............ 62/189, 239, 243, 324.1, 467; 165/96
See application file for complete search history.

(56) References Cited

U.S. PATENT DOCUMENTS

| | | | |
|---|---|---|---|
| 6,895,773 B2 | 5/2005 | Amaral | |
| 2002/0043413 A1 | 4/2002 | Kimishima et al. | |
| 2008/0223064 A1* | 9/2008 | Feuerecker et al. | .......... 62/324.2 |

FOREIGN PATENT DOCUMENTS

DE 601 12 279 T2 5/2006

* cited by examiner

*Primary Examiner* — Melvin Jones
(74) *Attorney, Agent, or Firm* — Muncy, Geissler, Olds & Lowe, P.C.

(57) ABSTRACT

A device for regulating a temperature of a plurality of components of a vehicle is provided. The device has a first heat exchanger and a second heat exchanger, which are connected to one another in order to form a closed refrigerant circuit. The device furthermore has a first multiway valve, a second multiway valve, a third multiway valve and a fourth multiway valve for connecting the first and the second heat exchanger to a first component and a second component of the vehicle.

10 Claims, 1 Drawing Sheet

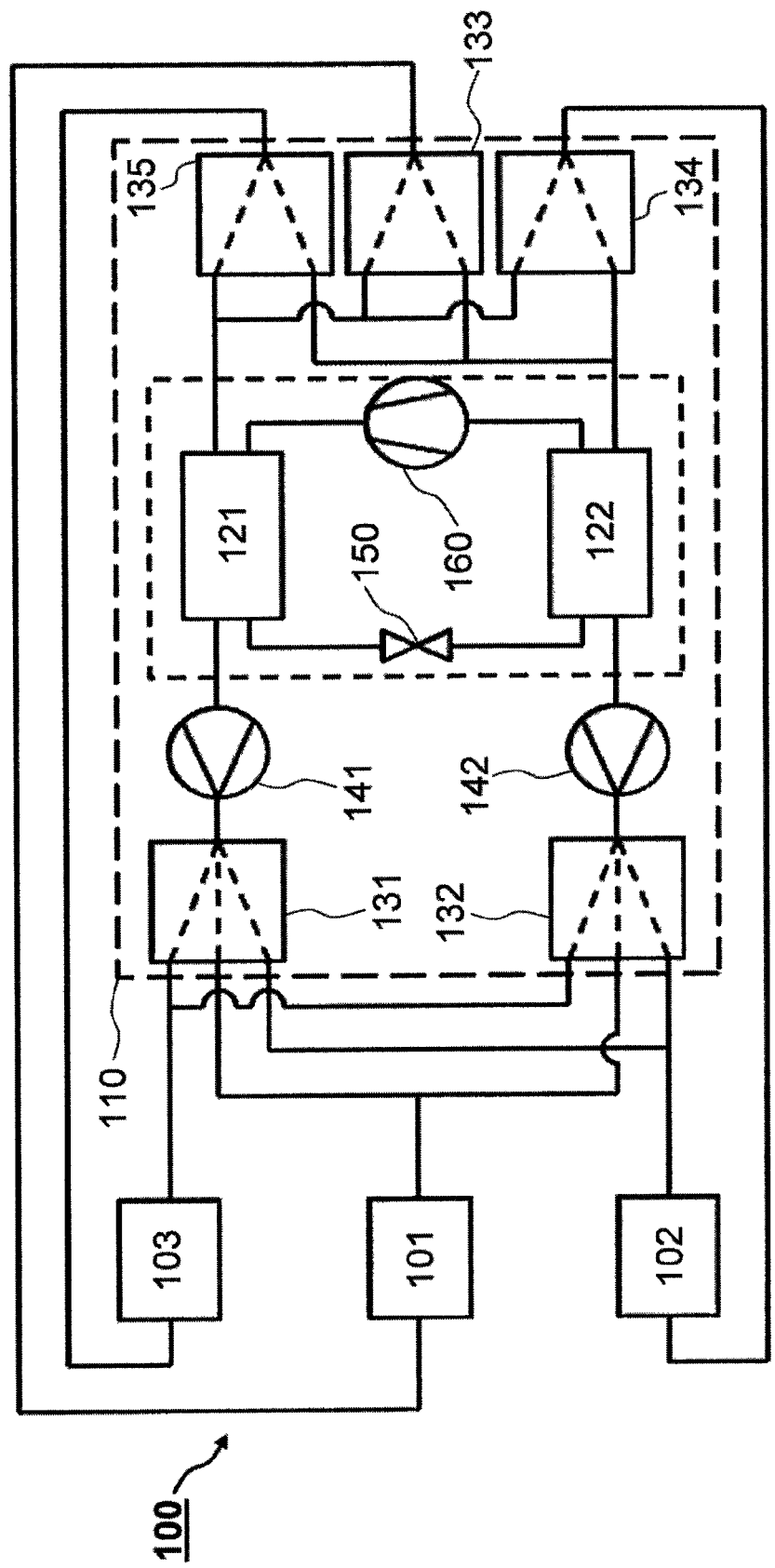

DEVICE FOR REGULATING THE TEMPERATURE OF A PLURALITY OF COMPONENTS OF A VEHICLE AND VEHICLE SYSTEM

This nonprovisional application claims priority under 35 U.S.C. §119(a) to German Patent Application No. DE 10 2011 082 584.3, which was filed in Germany on Sep. 13, 2011, and which is herein incorporated by reference.

BACKGROUND OF THE INVENTION

1. Field of the Invention

The present invention relates to a device for regulating the temperature of a plurality of components of a vehicle and to a vehicle system that has the device for temperature control.

2. Description of the Background Art

In vehicles, such as hybrid vehicles or electric vehicles, when modern high-performance batteries are used it must be ensured that the temperature of the batteries during operation is within a certain interval in order to guarantee the efficiency, operational reliability and safety of the batteries. On the one hand, the efficiency of the battery cells of the batteries declines very sharply if a suitable operating temperature is fallen below and the cells produce a high power dissipation. On the other hand, above a suitable operating range processes that lead to irreparable damage take place inside the cells. For these reasons battery temperature control, i.e., cooling or heating, is necessary. Furthermore, an air conditioning of the vehicle cabin is frequency necessary, i.e., the heating and cooling of the vehicle interior, depending on the applicable environmental conditions. Also further components, such as electric components, for example, require a temperature control. For regulating the temperature of the different components, heat transfer fluids, such as refrigerant, coolant, air, etc. are generally used. Thermal management plays an important role in hybrid vehicles and electric vehicles as well as in the off-highway field.

For various vehicle components a heating as well as a cooling must be provided. The plurality of components to be temperature regulated and the interaction thereof as well as the necessity of a simultaneous representation of heating and cooling for different components depending on environmental, operating and marginal conditions, result in a complex temperature control task.

To meet all temperature control requirements, several cooling circuits and heating circuits are often used, which are either operated independently of one another or can also be in interaction with one another. The complexity of the thermal management with the different components to be temperature regulated and the interactions thereof requires a broad and well-founded knowledge for designing a suitable, functional temperature control system.

SUMMARY OF THE INVENTION

It is therefore an object of the present invention to provide a compact, centralized device for regulating the temperature of a plurality of components of a vehicle and a vehicle system that has the device. This object is attained, in an embodiment, by a device for regulating the temperature of a plurality of components of a vehicle as well as a vehicle system.

In an embodiment, the present invention is based on the finding that a device for temperature control can be constructed such that the components to be temperature regulated can be supplied, for example, with a cooling agent by one or two heat exchangers in a need-based and independent manner. The device is thereby embodied in order to meet the temperature control demands in a vehicle by advantageous guidance and control of the cooling agent flows.

According to exemplary embodiments of the present invention, for example, a central temperature control unit or device for temperature control in a vehicle can independently take over the temperature control of different components in a vehicle via a cooling agent. The invention permits the independent, automatic, need-based heating and cooling of components, for example, in hybrid and electric vehicles as well as in non-automotive or off-highway applications. Accordingly, the device offers a simple way of implementing the different temperature control functions of complex design in the vehicle. According to exemplary embodiments of the present invention, the device is cost effective, space-saving, energy-efficient and easy to control and regulate. Further advantages of the invention lie in that, for example, the refrigerant circuit is extremely compact, contains little refrigerant and can be arranged outside the passenger compartment. Thus long refrigerant lines through the vehicle are not necessary. In particular with safety-relevant refrigerants, a leak in the passenger compartment e.g., in the event of an accident, can be considered critical. The danger of toxic refrigerant leaking into the passenger compartment, e.g. in the case of an accident, can thus be avoided. With the device according to the exemplary embodiments of the present invention, only coolant lines with more cost-effective cooling agent are guided to the respective components. The refrigerant circuit is thus designed in the most compact manner possible and the cooling or heating of the individual components takes place via the coolant guided to the individual components, for example, via hoses or lines. The use of only a small quantity of refrigerant is thus possible. Accordingly the placement and arrangement of the device can be freely selected.

The present invention provides in an embodiment, a device for the temperature control of a plurality of components of a vehicle, wherein the device includes a first heat exchanger with a coolant inlet, a coolant outlet, a refrigerant inlet and a refrigerant outlet and a second heat exchanger with a coolant inlet, a coolant outlet, a refrigerant inlet and a refrigerant outlet, wherein the refrigerant outlet of the first heat exchanger is connected to the refrigerant inlet of the second heat exchanger and the refrigerant outlet of the second heat exchanger is connected to the refrigerant inlet of the first heat exchanger in order to form a closed refrigerant circuit; a first multiway valve for coolant with an inlet connection connected to the coolant outlet of the first heat exchanger and with at least one first outlet connection that can be connected to a first component of the vehicle, and a second outlet connection that can be connected to a second component of the vehicle; a second multiway valve for coolant with an inlet connection connected to the coolant outlet of the second heat exchanger and with at least one first outlet connection that can be connected to the first component of the vehicle and a second outlet connection that can be connected to the second component of the vehicle; a third multiway valve for coolant with an inlet connection that can be connected to the first component of the vehicle, with a first outlet connection connected to the coolant inlet of the first heat exchanger, and with a second outlet connection connected to the coolant inlet of the second heat exchanger; and a fourth multiway valve for coolant with an inlet connection that can be connected to the second component of the vehicle, with a first outlet connection connected to the coolant inlet of the first heat exchanger and with a second outlet connection connected to the coolant inlet of the second heat exchanger. Optionally, further multiway valves can also be used.

The vehicle can be a vehicle for conveying people, loads or goods, for example, an automobile, bus, truck, fork lift truck or the like, in particular a vehicle with electric drive or hybrid drive, wherein the vehicle can be a road-bound vehicle or a rail-mounted vehicle. The multiway valves can be actuated in a suitable manner, e.g., magnetically, electrically, hydraulically, etc. and can be controlled in a suitable manner. The multiway valves, in particular the first multiway valve and the second multiway valve, can be at least two-way valves. The device can have fluid lines, by means of which the units of the device, such as heat exchanger and multiway valves, are connected to one another to render possible a fluid flow. The components of the vehicle to be temperature regulated can also be connected in terms of fluid by means of fluid lines to the corresponding units of the device. The components of the vehicle can be, for example, an electrochemical energy storage device or a battery of the vehicle, a cabin or vehicle interior, cargo space or passenger compartment of the vehicle, an engine or power electronics, etc. The components can also have fluid connections for coolant.

The multiway valves can be respectively embodied in order to render possible a flow of the coolant from the inlet connection to one of the outlet connections or in a changeable mass flow ratio to both outlet connections. The multiway valves can thus be embodied to render possible in a first operating position or valve position a fluid flow from the inlet connection to the first outlet connection. The multiway valves can also be embodied in order in a second operating position or valve position to render possible a fluid flow from the inlet connection to the second outlet connection. Finally, the multiway valves can be embodied in order to render possible in a region from third operating positions or valve positions a fluid flow from the inlet connection to the first outlet connection and to the second outlet connection, wherein the fluid flow between the first outlet connection and the second outlet connection can be divided in a variable ratio. An embodiment of this type provides the advantage that the temperature control of the components can be carried out in a particularly flexible, independent and need-based manner. The function of the multiway valves can also be embodied by a plurality of shut-off valves.

Furthermore, an electronic control device can be provided that is electrically connected to an input interface for receiving control information and to the multiway valves and is embodied in order to trigger the multiway valves based on the control information. The control device can thus be embodied, to trigger the multiway valves regardless of the control information such that a specific operating position or valve position is adjusted. An embodiment of this type provides the advantage that the cooling or heating of corresponding components can be taken over independently by the device by means of the integrated control of the valves. The temperature control function is thus carried out according to the control information independently and completely by the device.

According to an embodiment, the first heat exchanger can be a condenser. The second heat exchanger can be a chiller (heat exchanger between refrigerant and coolant). The condenser or refrigerant coil can thereby be arranged on a high side or hot side of the device. The chiller can be arranged on a low side or cold side of the device. Each of the heat exchangers is embodied in order to render possible a heat transfer between the refrigerant and the coolant. An embodiment of this type provides the advantage that in this manner a temperature control of the components can be achieved efficiently by heating and/or cooling the same by its heat exchangers.

According to an embodiment, the first multiway valve can have a third outlet connection that can be connected to a third component of the vehicle. The second multiway valve can also have a third outlet connection that can be connected to the third component of the vehicle. The device can thereby have a fifth multiway valve for coolant with an inlet connection that can be connected to the third component of the vehicle, with a first outlet connection connected to the coolant inlet of the first heat exchanger and with a second outlet connection connected to the coolant inlet of the second heat exchanger. In this manner a further component of the vehicle can also be connected to the device. The first multiway valve hereby has a further outlet connection, the second multiway valve has a further outlet connection and a further multiway valve for coolant with an inlet connection that can be connected to the further components of the vehicle, with a first outlet connection connected to the coolant inlet of the first heat exchanger, and with a second outlet connection connected to the coolant inlet of the second heat exchanger is provided. An embodiment of this type provides the advantage that at least one further component to be temperature regulated can be easily connected to the device. A number of components that can be temperature regulated by means of the device can thus be expanded easily by one or more components.

The third component can hereby be a low-temperature cooler. An embodiment of this type has the advantage that an efficient, simultaneous and need-based temperature control of the first component and the second component is rendered possible. Furthermore, a flow through of the low-temperature cooler with coolant can also be used, if desired, not to act on other components with the full mass flow of the coolant.

Furthermore, a first coolant pump can be provided, which is connected between the coolant outlet of the first heat exchanger and the inlet connection of the first multiway valve. A second coolant pump can also be provided, which is connected between the coolant outlet of the second heat exchanger and the inlet connection of the second multiway valve. The coolant pumps can be electrically connected to the electronic control device and can be triggered by the same. An embodiment of this type provides the advantage that a flow rate of the coolant can be controlled precisely and in a need-based manner by means of the pumps.

Furthermore, a compressor can be provided, which is connected between the refrigerant outlet of the second heat exchanger and the refrigerant inlet of the first heat exchanger. The compressor can be electrically connected to the electronic control device and can be triggered by the same. The compressor is thus connected in the refrigerant circuit. An embodiment of this type provides the advantage that the device can take over independently the cooling or heating of corresponding components with the integrated control of the compressor and the valves. The refrigerant circuit can be controlled on a need-based basis by means of the compressor. The temperature control function can thus be carried out completely by the device.

Furthermore, a throttle can be provided, which is connected between the refrigerant outlet of the first heat exchanger and the refrigerant inlet of the second heat exchanger. The throttle is thus connected in the refrigerant circuit. An embodiment of this type provides the advantage that the refrigerant circuit can be operated efficiently.

The present invention furthermore creates a vehicle system including: a first component for temperature control and a second component for temperature control; and a device for temperature control of a plurality of components according to a described embodiment, wherein the first outlet connection of the first multiway valve, the first outlet connection of the second multiway valve and the inlet connection of the third multiway valve are connected to the first component, wherein the second outlet connection of the first multiway valve, the second outlet connection of the second multiway valve and the inlet connection of the fourth multiway valve are connected to the second component.

In a vehicle system of this type, the above-mentioned device can be applied or used advantageously to regulate the temperature of the components.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the sole FIGURE illustrates a diagrammatic representation of a vehicle system according to an exemplary embodiment of the present invention.

DETAILED DESCRIPTION

In the following description of the preferred exemplary embodiments of the present invention, the same or similar reference numbers are used for the elements shown in the various drawings with similar effect, wherein a repeated description of these elements is omitted.

FIG. 1 shows a diagrammatic representation of a vehicle system 100 according to an exemplary embodiment of the present invention. The vehicle system 100 has a first component 101, which according to the present exemplary embodiment can be an air conditioning device for air conditioning a cabin of the vehicle, a second component 102, which according to the present exemplary embodiment can be a battery of the vehicle, a third component 103, which according to the present exemplary embodiment can be a low-temperature cooler, a device 110 for temperature control, a first heat exchanger 121, which according to the present exemplary embodiment can be a condenser or refrigerant coil, a second heat exchanger 122, which according to the present exemplary embodiment can be a chiller (heat exchanger refrigerant/coolant), a first multiway valve 131, a second multiway valve 132, a third multiway valve 133, a fourth multiway valve 134, a fifth multiway valve 135, a first coolant pump 141, a second coolant pump 142, a throttle 150 and a compressor 160.

The device 110 is embodied in order to regulate the temperature of the components 101, 102, 103. The device 110 has the first heat exchanger 121, the second heat exchanger 122, the first multiway valve 131, the second multiway valve 132, the third multiway valve 133, the fourth multiway valve 134, the fifth multiway valve 135, the first coolant pump 141, the second coolant pump 142, the throttle 150 and the compressor 160 as well as fluid lines, not explicitly provided with reference numbers in FIG. 1, which connect the elements of the device 110 in terms of fluid.

The first heat exchanger 121 can be a condenser or a refrigerant coil. The first heat exchanger 121 has a coolant inlet, a coolant outlet, a refrigerant inlet and a refrigerant outlet. The refrigerant outlet of the first heat exchanger 121 is connected by means of a fluid line for refrigerant to the refrigerant inlet of the second heat exchanger 122. The coolant inlet of the first heat exchanger 121 can be connected by means of fluid lines for coolant to the first outlet connections of the third multiway valve 133, of the fourth multiway valve 134 and of the fifth multiway valve 135. The coolant outlet of the first heat exchanger 121 can be connected by means of a fluid line for coolant to the inlet connection of the first multiway valve 131, wherein the first fluid pump 141 is connected between the same.

The second heat exchanger 122 can be a chiller. The second heat exchanger 122 has a coolant inlet, a coolant outlet, a refrigerant inlet and a refrigerant outlet. The refrigerant outlet of the second heat exchanger 122 is connected by means of a fluid line for refrigerant to the refrigerant inlet of the first heat exchanger 121. The coolant inlet of the second heat exchanger 122 can be connected by means of fluid lines for coolant to the second outlet connections of the third multiway valve 133, of the fourth multiway valve 134 and of the fifth multiway valve 135. The coolant outlet of the second heat exchanger 122 can be connected by means of a fluid line for coolant to the inlet connection of the second multiway valve 132, wherein the second fluid pump 142 is connected between the same.

Thus a closed refrigerant circuit is formed by the first heat exchanger 121, the second heat exchanger 122 and the fluid lines for refrigerant. The throttle 150 is connected between the refrigerant outlet of the first heat exchanger 121 and the refrigerant inlet of the second heat exchanger 122 in the refrigerant circuit. The compressor 160 is connected between the refrigerant outlet of the second heat exchanger 122 and the refrigerant inlet of the first heat exchanger 121 in the refrigerant circuit.

The first multiway valve 131 for coolant has an inlet connection connected by means of a fluid line for coolant to the coolant outlet of the first heat exchanger 121, a first outlet connection connected by means of a fluid line for coolant to the first component 101 of the vehicle, a second outlet connection connected by means of a fluid line for coolant to a second component 102 of the vehicle, and a third outlet connection connected by means of a fluid line for coolant to the third component 103 of the vehicle.

The second multiway valve 132 for coolant has an inlet connection connected by means of a fluid line for coolant to the coolant outlet of the second heat exchanger 122, a first outlet connection connected by means of a fluid line for coolant to the first component 101 of the vehicle, a second outlet connection connected by means of a fluid line for coolant to the second component 102 of the vehicle and a third outlet connection connected by means of a fluid line for coolant to the third component 103 of the vehicle.

The third multiway valve 133 for coolant has an inlet connection connected by means of a fluid line for coolant to the first component 101 of the vehicle, a first outlet connection connected by means of a fluid line for coolant to the coolant inlet of the first heat exchanger 121, and a second outlet connection connected by means of a fluid line for coolant to the coolant inlet of the second heat exchanger 122.

The fourth multiway valve 134 for coolant has an inlet connection connected by means of a fluid line for coolant to the second component 102 of the vehicle, a first outlet connection connected by means of a fluid line for coolant to the coolant inlet of the first heat exchanger 121, and a second outlet connection connected by means of a fluid line for coolant to the coolant inlet of the second heat exchanger 122.

The fifth multiway valve 135 for coolant has an inlet connection connected by means of a fluid line for coolant to the third component 103 of the vehicle, a first outlet connection connected by means of a fluid line for coolant to the coolant inlet of the first heat exchanger 121 and a second outlet connection connected by means of a fluid line for coolant to the coolant inlet of the second heat exchanger 122.

The multiway valves 131, 132, 133, 134 and 135 are respectively embodied in order to render possible a flow of the coolant from the respective inlet connection to one of the outlet connections or in a changeable mass flow ratio to several outlet connections.

The first coolant pump 141 is connected between the coolant outlet of the first heat exchanger 121 and the inlet connection of the first multiway valve 131. The second coolant pump 142 is connected between the coolant outlet of the second heat exchanger 122 and the inlet connection of the second multiway valve 132.

The first component 101 can be an air conditioning device for air conditioning a cabin or an interior of the vehicle. The first component 101 can be connected to the first outlet connection of the first multiway valve 131, the first outlet connection of the second multiway valve 132 and the inlet connection of the third multiway valve 133.

The second component 102 can be a battery or an energy storage device of the vehicle. For example, it can be a battery for driving an electric vehicle or electric-hybrid vehicle. The second component 102 can be connected to the second outlet connection of the first multiway valve 131, the second outlet connection of the second multiway valve 132 and the inlet connection of the fourth multiway valve 134.

The third component 103 can be a low-temperature cooler. The third component 103 can be connected to the third outlet connection of the first multiway valve 131, the third outlet connection of the second multiway valve 132 and the inlet connection of the fifth multiway valve 134.

Although it is not shown in FIG. 1, the device 110 can have an electronic control device, which is electrically connected to an input interface for receiving control information and to the multiway valves 131, 132, 133, 134 and 135 and to the compressor 160 and optionally to the pumps 141 and 142 and is embodied to control the multiway valves 131, 132, 133, 134, and 135 as well as the compressor 160 and optionally the pumps 141 and 142 based on the control information.

To put it another way, the device 110 comprises a refrigerant circuit, which has on a high side or hot side a heat exchanger 121 as well as on the low side or cold side a heat exchanger 122 between refrigerant and coolant. Both of the heat exchangers 121, 122 respectively have an infeed and discharge for the coolant. Furthermore, the device 110 has multiway valves for distributing and combining the coolant flows. On the hot side as well as on the cold side, the coolant flow can be distributed among respectively at least three different flow paths, wherein intermediate positions between two paths or simultaneous flow through of several paths are also conceivable. In the feedback one multiway valve with respectively two flow paths or distribution among two flow paths is arranged for each component to be temperature controlled.

By means of intelligent switching of the valves, all of the combinations of cooling and heating or temperature control modes for the different components can be realized, as is explained in greater detail below. According to the exemplary embodiment shown in FIG. 1, by way of example two components 101, 102 to be temperature regulated are shown, which are a battery 102 and a cabin 101 respectively. The low temperature cooler 103 is advantageous in the event that the battery 102 and the cabin 101 are to be temperature regulated in the same mode (cooling or heating). Furthermore, the low-temperature cooler 103 can also be flowed through, in order not to act on other components 101, 102 with full mass flow. The device 110 has an interface that receives the control information for heating and cooling the corresponding components 101, 102. An electronic unit or electronic control device belonging to the device 110 processes this control information and triggers accordingly the compressor 160 and the multiway valves 131, 132, 133, 134 and 135 as well as optionally the pumps 141 and 142. In an alternative embodiment the control information for cooling/heating can also represent several steps of a temperature control, such as maximum, moderate or low cooling or heating, etc. The first coolant pump 141 is arranged on the hot side in the fluid flow direction directly behind the first heat exchanger 121 on the hot side, while the second coolant pump 142 is arranged in the fluid flow direction directly behind the second heat exchanger 122 on the cold side. The two coolant pumps 141, 142 are used to recirculate the hot and the cold coolant.

In a first temperature control mode, a cooling of the battery 102 and a cooling of the cabin 101 can be effected, wherein the battery 102 is supplied with coolant from the chiller 122, the cabin 101 is supplied with coolant from the chiller 122 and the low temperature cooler 103 is supplied with coolant from the condenser 121. In a second temperature control mode, a cooling of the battery 102 and a heating of the cabin 101 can be effected, wherein the battery 102 is supplied with coolant from the chiller 122, the cabin 101 is supplied with coolant from the condenser 121 and the low temperature cooler 103 is optionally supplied with coolant from the condenser 121. In a third temperature control mode, a cooling of the battery 102 can be effected without temperature control of the cabin 101, wherein the battery 102 is supplied with coolant from the chiller 122, the cabin 101 is not supplied with coolant and the low temperature cooler 103 is supplied with coolant from the condenser 121. In a fourth temperature control mode, a heating of the battery 102 and a cooling of the cabin 101 can be effected wherein the battery 102 is supplied with coolant from the condenser 121, the cabin 101 is supplied with coolant from the chiller 122 and the low temperature cooler 103 is optionally supplied with coolant from the chiller 122. In a fifth temperature control mode a heating of the battery 102 and a heating of the cabin 101 can be effected, wherein the battery 102 is supplied with coolant from the condenser 121, the cabin 101 is supplied with coolant from the condenser 121 and the low temperature cooler 103 is supplied with coolant from the chiller 122. In a sixth temperature control mode, a heating of the battery 102 can be effected without temperature control of the cabin 101, wherein the battery 102 is supplied with coolant from the condenser 121, the cabin 101 is not supplied with coolant and the low temperature cooler 103 is supplied with coolant from the chiller 122. In a seventh temperature control mode, without a temperature control of the battery 102 a cooling of the cabin 101 can be effected, wherein the battery 102 is not supplied with coolant, the cabin 101 is supplied with coolant from the chiller 122 and the low temperature cooler 103 is supplied with coolant from the condenser 121. In an eighth temperature control mode, without a temperature control of the battery 102 a heating of the cabin 101 can be effected, wherein the battery 102 is not supplied with coolant, the cabin 101 is supplied with coolant from the condenser 121 and the low temperature cooler 103 is supplied with coolant from the chiller 122. In a ninth temperature control mode, neither a temperature control of the battery 102 or a temperature control of the cabin 101 can be caused, wherein neither the battery 102 nor the cabin 101 nor the low temperature cooler 103 are supplied with coolant.

Alternative exemplary embodiments of the present invention also render possible a heat pump operation of the device 110 in the vehicle system 100.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for regulating a temperature of a plurality of components of a vehicle, the device comprising:
   a first heat exchanger having a coolant inlet, a coolant outlet, a refrigerant inlet and a refrigerant outlet;
   a second heat exchanger with a coolant inlet, a coolant outlet, a refrigerant inlet and a refrigerant outlet, wherein the refrigerant outlet of the first heat exchanger is connectable to the refrigerant inlet of the second heat exchanger and the refrigerant outlet of the second heat exchanger is connectable to the refrigerant inlet of the first heat exchanger thereby forming a closed refrigerant circuit;
   a first multiway valve for coolant with an inlet connection connectable to the coolant outlet of the first heat exchanger and with at least one first outlet connection that is connectable to a first component of the vehicle, and a second outlet connection that is connectable to a second component of the vehicle;
   a second multiway valve for coolant with an inlet connection connectable to the coolant outlet of the second heat exchanger and with at least one first outlet connection that is connectable to the first component of the vehicle and a second outlet connection that is connectable to the second component of the vehicle;
   a third multiway valve for coolant with an inlet connection connectable to the first component of the vehicle, with a first outlet connection that is connectable to the coolant inlet of the first heat exchanger, and with a second outlet connection connectable to the coolant inlet of the second heat exchanger; and
   a fourth multiway valve for coolant with an inlet connection that is connectable to the second component of the vehicle, with a first outlet connection connectable to the coolant inlet of the first heat exchanger and with a second outlet connection connectable to the coolant inlet of the second heat exchanger.

2. The device according to claim 1, wherein the multiway valves are adapted to allow a flow of the coolant from the inlet connection to one of the outlet connections or in a changeable mass flow ratio to several outlet connections.

3. The device according to claim 1, further comprising an electronic control device that is electrically connectable to the multiway valves and to an input interface for receiving control information, wherein the electronic control device is configured to trigger the multiway valves based on the control information.

4. The device according to claim 1, wherein the first heat exchanger is a condenser and the second heat exchanger is a chiller.

5. The device according to claim 1, wherein the first multiway valve has a third outlet connection that is connectable to a third component of the vehicle and the second multiway valve has a third outlet connection that is connectable to the third component of the vehicle, and wherein the device has a fifth multiway valve for coolant with an inlet connection that is connectable to the third component of the vehicle, with a first outlet connection connectable to the coolant inlet of the first heat exchanger and with a second outlet connection connectable to the coolant inlet of the second heat exchanger.

6. The device according to claim 5, wherein the third component is a low-temperature cooler.

7. The device according to claim 1, further comprising:
   a first coolant pump that is connectable between the coolant outlet of the first heat exchanger and the inlet connection of the first multiway valve; and
   a second coolant pump that is connectable between the coolant outlet of the second heat exchanger and the inlet connection of the second multiway valve.

8. The device according to claim 1, further comprising a compressor that is connectable between the refrigerant outlet of the second heat exchanger and the refrigerant inlet of the first heat exchanger.

9. The device according to claim 1, further comprising a throttle that is connectable between the refrigerant outlet of the first heat exchanger and the refrigerant inlet of the second heat exchanger.

10. A vehicle system comprising:
    a first component that is to be temperature regulated;
    a second component that is to be temperature regulated; and
    a device according to claim 1,
    wherein the first outlet connection of the first multiway valve, the first outlet connection of the second multiway valve, and the inlet connection of the third multiway valve are connectable to the first component, and
    wherein the second outlet connection of the first multiway valve, the second outlet connection of the second multiway valve, and the inlet connection of the fourth multiway valve are connectable to the second component.

* * * * *